United States Patent [19]

Sugimura

[11] Patent Number: 4,705,077

[45] Date of Patent: Nov. 10, 1987

[54] PULSATION DAMPING MEANS INCORPORATING THEREIN AN INNER CYLINDER HAVING LAMINATED RESILIENT VALVE SHOES

[76] Inventor: Nobuyuki Sugimura, 308, Mabase, Shimizu-shi, Shizuoka-ken, Japan

[21] Appl. No.: 5,373

[22] Filed: Jan. 12, 1987

Related U.S. Application Data

[63] Continuation of Ser. No. 751,141, Jul. 2, 1985, abandoned.

[51] Int. Cl.[4] ............................................. F16L 55/02
[52] U.S. Cl. ..................................... 138/30; 251/61.1
[58] Field of Search ............................. 92/92; 138/30; 251/61.1

[56] References Cited

U.S. PATENT DOCUMENTS

| | | | |
|---|---|---|---|
| 2,659,391 | 11/1953 | Berger | 92/92 X |
| 3,182,685 | 5/1965 | Mercier | 138/30 |
| 3,483,892 | 12/1969 | Sugimura et al. | 251/61.1 X |

FOREIGN PATENT DOCUMENTS

| | | | |
|---|---|---|---|
| 1298795 | 9/1966 | Fed. Rep. of Germany | 138/30 |
| 646410 | 6/1966 | Japan | 138/30 |

Primary Examiner—Henry J. Recla
Assistant Examiner—Mark J. Thronson
Attorney, Agent, or Firm—Wood, Dalton, Phillips, Mason & Rowe

[57] ABSTRACT

In a pulsation absorbing device which comprises inside its cylindrical pressure vessel, a cylindrical resilient diaphragm, an inner cylinder formed with a plurality of communicating holes on the outer surface thereof, and the resilient diaphragm and the inner cylinder are disposed being concentrical with the cylindrical pressure vessel, in addition, one or more resilient valve shoes of arched shape in its transverse cross section disposed along the outer surface of the inner cylinder and at the location corresponding to the communicating holes and is capable of being placed in a raised or lowered position, the improvement resides in that the resilient valve shoes are composed of a plurality of thin membranes laminated with each other, so that the valve shoes not only can be readily deformed elastically responsive to any possible pressure variation, but also can secure strength sufficient to withstand the fluid pressure when they are positioned to cover and close the aforesaid communicating holes.

7 Claims, 7 Drawing Figures

PULSATION DAMPING MEANS INCORPORATING THEREIN AN INNER CYLINDER HAVING LAMINATED RESILIENT VALVE SHOES

This application is a continuation of application Ser. No. 751,141, filed 7/2/85 now abandoned.

This invention relates to pulsation damping means incorporating therein an inner cylinder provided with one or more laminated resilient valve shoes for compensating for fluid hammer or pulsation and is suitable to be applied in hydraulic system such as hydraulic or oil hydraulic means.

As a kind of this apparatus, there is one which comprises, a cylindrical pressure vessel, an inlet ring and an outlet ring at both its axial ends, a cylindrical resilient diaphragm and an inner cylinder within said pressure vessel formed with a plurality of communicating holes both of which are disposed concentric with the pressure vessel and in the order from outside to inside, and one or more resilient valve shoes of arcuated shape in cross section and is allowed to be raised or lowered and is located to cover the communicating holes so as to prevent the resilient diaphragm member from being damaged when it is pushed into the communicating holes. It is necessary for the resilient valve shoes to be fabricated with such a thickness that the valve shoes do not enter into the communicating holes when they are urged by the diaphragm toward the holes so that the arched resilient shoes do not damage the resilient diaphragm.

If an effort is made to secure a sufficient thickness, however, the valve shoes become difficult to be deformed, so that they are not able to completely close the communicating holes, thus the resilient diaphragm member will enter into the gap formed therearound. On the other hand, if one reduces the thickness of the resilient valve to avoid such problems, the valve shoes are liable to be pushed into the communicating holes and also be damaged, due to their insufficient proof pressure strength.

Such being the case, since the two requirements, that is, to render the valve member more deformable by reducing its modulus of elasticity, and the other to increase the strength are incompatible, it has long been deemed difficult to fully protect the resilient diaphragm member in the prior art pulsation damper. (Japanese Patent No. 646410).

The present invention aims to make the resilient valve shoes in the pulsation damper having an inner cylinder more readily deformable responsive to the expansion of the resilient diaphragm member but without weakening the proof pressure strength.

The present invention is a pulsation damping or compensating device which comprises, within its cylindrical pressure vessel, a cylindrical resilient diaphragm, an inner cylinder formed therearound a plurality of communicating holes and is disposed concentrical with both the pressure vessel and the diaphragm, and one or more valve shoes of arched shape in transverse cross section and are disposed at the position of the communicating holes capable of being raised or lowered, wherein the inner cylinder of the device is provided with one or more resilient valve shoes composed of a plurality of thin membranes which are laminated with each other.

In application, a pressurized gas (nitrogen) at a pressure being balanced with the line pressure is introduced through a gas supply port disposed near the middle part of the cylinder wall of the vessel.

When fluid under pressure is introduced through a fluid supply port disposed at one end of the pressure vessel toward the fluid outlet port disposed at the other end of the vessel, a part of the pressure fluid flows into the interior of the resilient diaphragm and urges the diaphragm, from its inside toward the inner wall of the pressure vessel. When the gas pressure and the pressure of the fluid are kept balanced, and if there arise any change of pressure such as pulsation in the fluid, the fluid would compress or allow the gas in the gas chamber to expand via the resilient diaphragm to absorb or dampen the pressure change of fluid such as pulsation. If the fluid pressure decreases greatly during these periods, the gas in the gas chamber will expand and the resilient diaphragm will tightly contact the inner cylinder, however, immediately before such contact, the resilient diaphragm urges the resilient valve shoes toward the outer surface of the inner cylinder in such a direction that its arched shape will expand and cover and close the communicating holes.

It is to be noted that, when the arched valve shoes expand along the outer surface of the inner cylinder, the plural number of thin membranes which constitute the resilient valve shoes will slide relative to each other and facilitate the deformation of the valve shoes as a whole. Strength of the thus laminated thin membranes can also withstand the external force of the resilient diaphragm and prevent its entering into the communicating holes.

In the drawings,

FIG. 1 is a longitudinal cross sectional view of the hydraulic accumulator according to the present invention, FIG. 2 is an enlarged cross sectional view taken along line II—II of FIG. 1, FIG. 3 is also an enlarged cross sectional view showing another state of operation of the device as shown in FIG. 2, FIG. 4 is a perspective view showing one of the shoes, a part of the component of the device shown in FIGS. 1-3.

FIG. 6 and FIG. 7 show another embodiment of the present invention, wherein FIG. 6 is a perspective view similar to FIG. 4, and FIG. 7 is a sectional view corresponding to FIG. 5.

Figure 1:
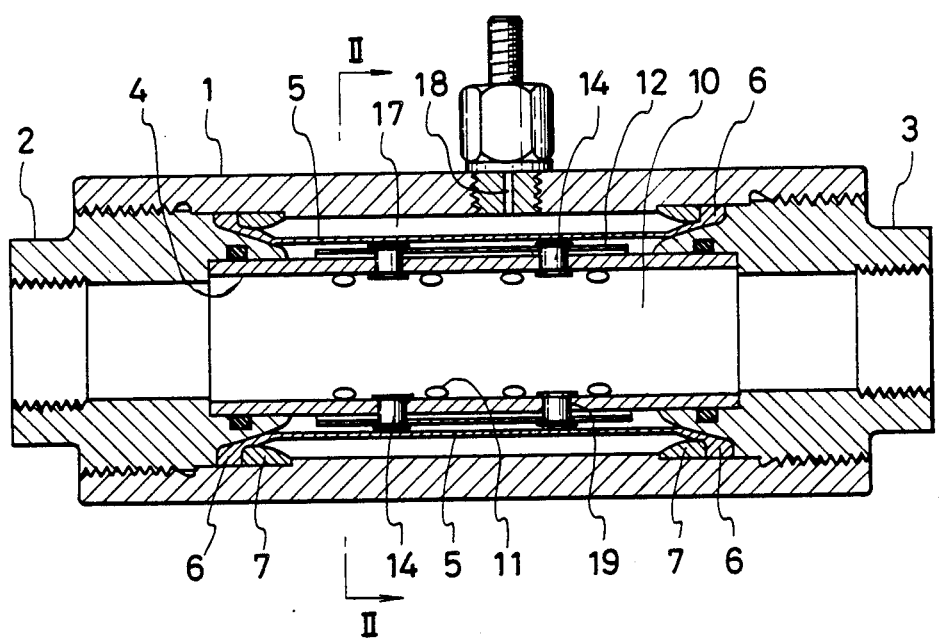

As shown in FIGS. 1 through 7, an inlet cylinder 2 and an outlet cylinder 3 are threadedly plugged in at one axial end and the other axal end, respectively, of a cylindrical pressure vessel 1, and these two cylindrical members 2 and 3 cooperatively clamp an inner cylinder 4 at its both axial ends. Around the outer surface of the inner cylinder 4, a cylindrical resilient diaphragm 5 fabricated of resilient material such as rubber or elastomer is concentrically disposed, radially and axially extending flange portions 6 at its both axial ends are clamped between a retaining ring 7 and the inlet cylinder 2 and between the other retaining ring 7 and the outlet ring 3, respectively.

In addition, a plurality of communicating holes 11 are formed on and pass through the wall of the inner cylinder 4, and one or more sets of resilient valve shoes (in this embodiments two sets), consisting of arched thin membranes 12a and 12b being laminated with each other, are disposed between the outer surface of the inner ring having the communication holes and the diaphragm.

Both transverse side edges of these thin membranes 12a and 12b are cut away at their intermediate portion to define a plurality of recesses 23B, and these membranes are the same in thickness, the transverse length L of the lower membrane 12b is formed larger than that (l) of the upper membrane 12a. The valve shoes 12 are loosely coupled to the inner cylinder 4 by using suitable number of radially slidable pins 14, so that each the valve shoes can normally be raised at their transverse intermediate portion away from the outer surface of the inner cylinder due to their own resiliency, while their transverse side edges are kept in contact with the outer surface. When hydraulic pressure of the fluid flowing from the inlet cylinder 2 to the outlet cylinder 3 decreases letting, the pressure of the gas in the gas chamber 17 defined between the resilient diaphragm 5 and the pressure vessel 1, become higher than the pressure of the fluid, there results compression of the resilient diaphragm 5 toward the center, the diaphragm urges the resilient valve shoes 12 toward the center of the inner cylinder 4. This means, as shown in FIG. 2, that the resilient diaphragm 5 depresses the resilient valve shoes 12 at their intermediate portion 15 toward the outer surface of the inner cylinder 4 and to contact therewith, and at the same time, makes both transverse side edges to slide in two opposite directions shown by arrow lines A16, namely, to widen the cord of the arch, as a whole, and finally by discharging all the fluid contained in the space as shown in FIG. 3.

At this moment all the communicating holes 11 are completely covered and closed by the resilient valve shoes 12.

Figure 2:
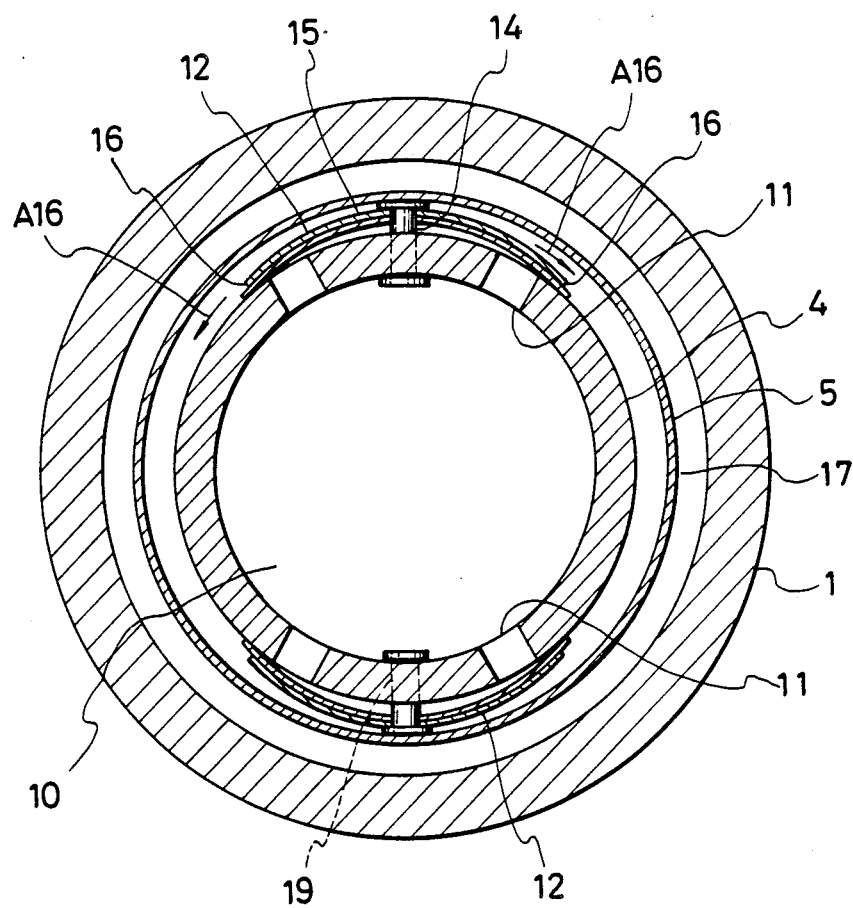
Figure 3:
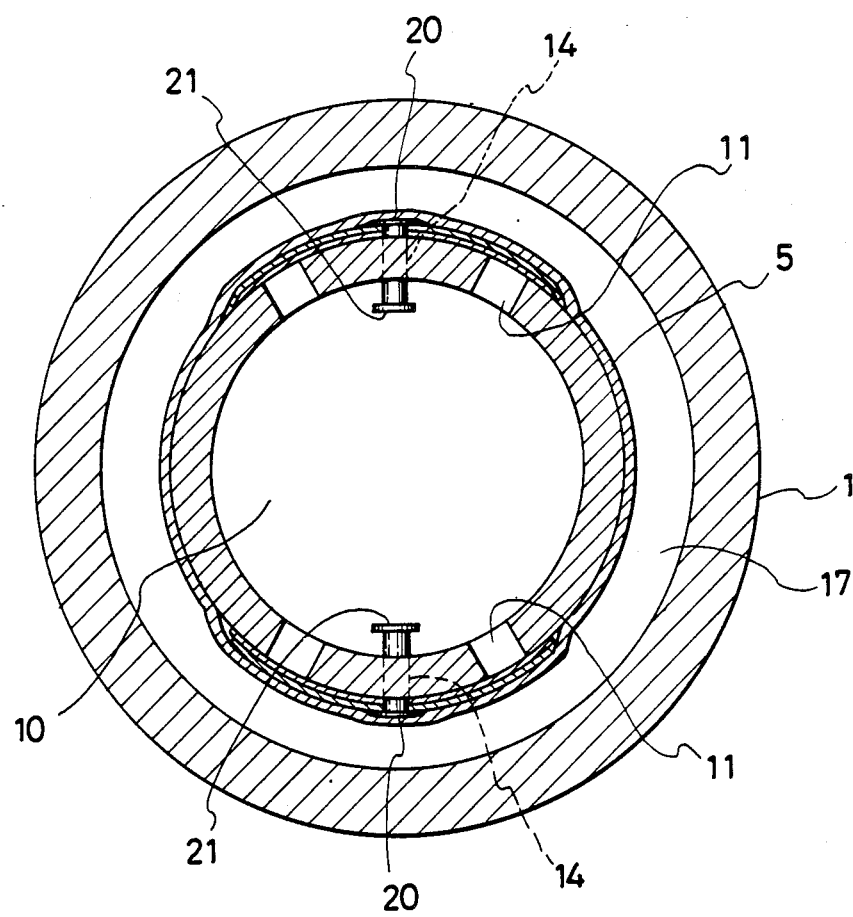
Figure 4:
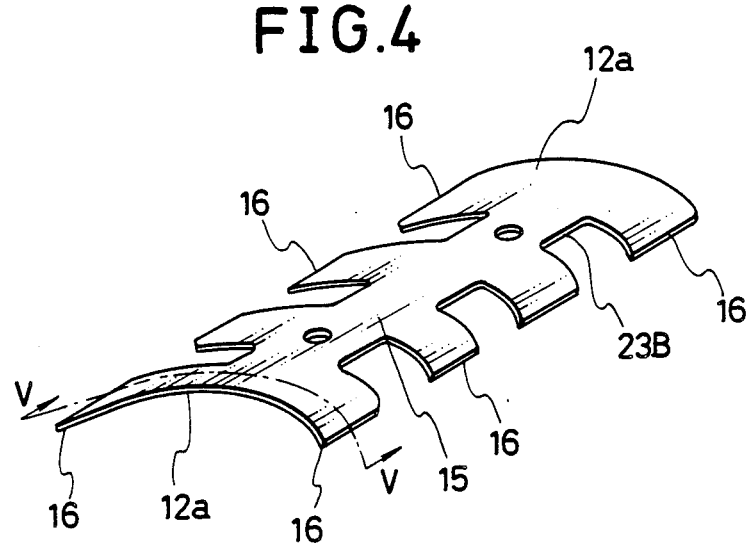

On the contrary, if the hydraulic pressure in the inner cylinder increases over the pressure in the gas chamber 17, the resilient diaphragm 5 moves in the direction reverse to that described above, thus allowing the fluid in the inner cylinder to flow outside through the communicating holes 11 and to expand the diaphragm 5 to return to the condition shown by FIG. 2 from the position as shown by FIG. 3.

In the drawing, numeral 10 denotes the passageway of the fluid under pressure, 18 is the gas supply port through which a gas is previously introduced in the pressure vessel so as to maintain the gas chamber 17 at a predetermined pressure.

Numeral 19 denotes suitable number of through holes for passing respective pin 14, which is formed separately from the communicating holes 11, shown by 20 and 21 are stoppers formed at both axial ends of each pin 14.

Figure 6:
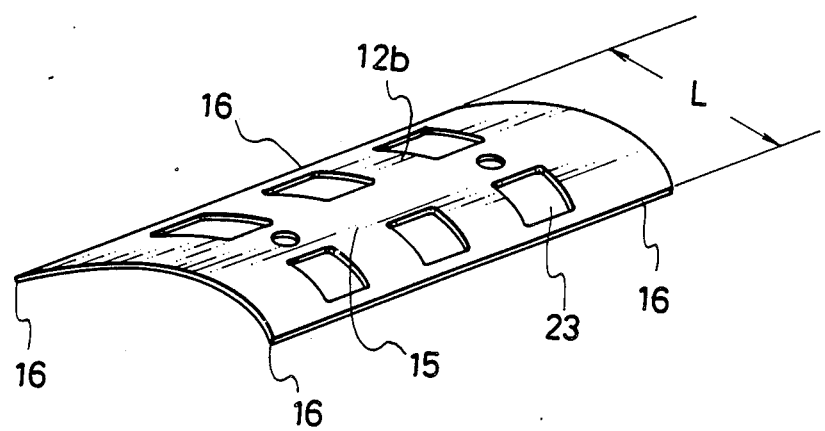
Figure 7:
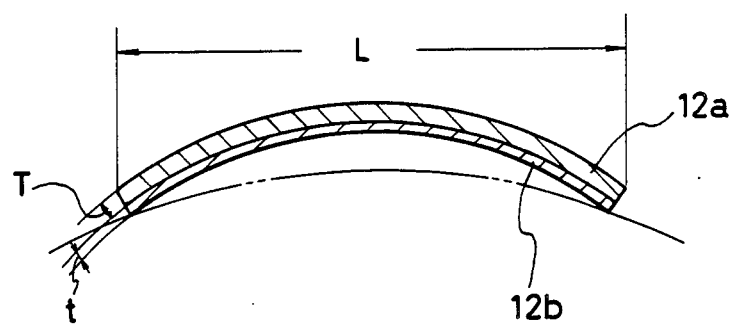

The present invention is not limited to the embodiment as described above, but can be practiced in many other manners, for instance, both the transverse side edges of the thin membrane 12b or 12a can be made straight, instead a suitable number of through openings 23 can be formed as shown in FIG. 6. In addition, each of the transverse length (width) of the two thin membranes 12a and 12b can be made the same, while the lower membrane 12b is formed to have a thickness t smaller than that T of the upper membrane 12a.

Figure 5:
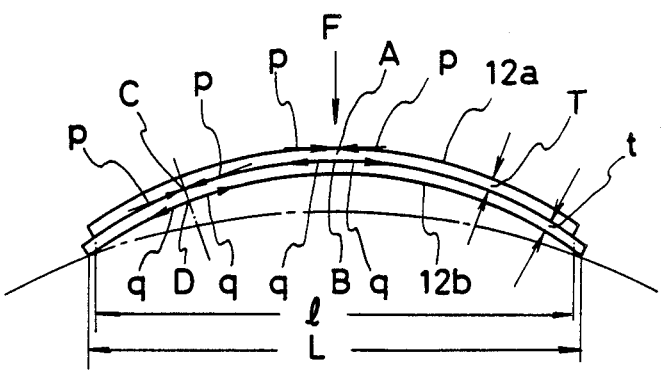
FIG. 5 is an enlarged view of a part of the device shown in FIG. 2.

In a pulsation damper of the type incorporating an inner cylinder provided with one or more arch shaped resilient valve shoes in its transverse cross section disposed between the resilient diaphragm and the inner cylinder at the position suitable for covering and closing the communicating holes, the present invention utilizes the resilient valve shoes composed of a plurality of thin membranes laminated one after another, accordingly, these thin membranes slide relative to each other during the elastic deformation of the valve shoes for closing the communicating holes or in opening action, thereby greatly facilitating the deformation of the valve shoes themselves as a whole. This function will now be explained hereunder, since the two thin membranes 12a and 12b are laminated as shown in FIG. 5, when pressure force F is applied from outside to the gas chamber, compressive force p will act on the outer side A of the thin membrane 12a, resulting in tensile force q at the inner side B similarly, compressive force p at the outer side C of the membrane 12b and tensile force q on the inner side D.

At this moment, since the valve shoe deforms at the contact surface between the membrane 12a and 12b while causing some extent of slippage due to the compressive force p and the tensile force q, the valve shoe of laminated type can be more readily deformed than that made of a single piece membrane.

Generally, modulus of section Z under bending moment can be expressed by an equation:

$$Z = (bH^2/6)$$

where transverse length of the section (width) is b and longitudinal length (height) is H From the above formula, modulus of section of the member having width b and the height H prepared by laminating two sheets of resilient valve shoes of H/2 be expressed as:

$$Z = (b(H/s)^2/6) \times 2 = (bH^2/12)$$

which is equal to half of that of the resilient valve shoe of single piece type, and is readily deformable.

This fact can be explained based on the formula expressing the modulus of section Z as described above.

In addition, the strength of the resilient valve shoe 12, when it covers and closes each communicating hole 11, against the compressive force F acting on the valve shoe, is proportion to the total sum of each membrane 12a and 12b, accordingly, there arises no fear that the laminated valve shoe may be lowered in strength as compared with that fabricated of a single piece membrane.

As explained above, the present invention has rendered two aimed requirements compatible, that is, one to make resilient valve shoes readily deformable in response to the variation in hydraulic pressure, and the other to ensure sufficient strength of the valve shoes when they are urged to cover communicating holes. By virtue of these meritorious effects, it has become possible to protect resilient diaphragm of the hydraulic accumulator from any possible damage in a more effective manner and also to maintain longer and steadier service life.

What we claim is:

1. In a pulsation absorbing device including a pressure vessel, a cylindrical resilient diaphragm, an inner cylinder disposed within the diaphragm substantially concentric therewith, and the inner cylinder having radially directed hydraulic fluid openings therethrough, the improvement comprising: resilient valve shoes of arched shape in transverse cross section disposed upon the outer surface of said inner cylinder and at a location to cover said fluid openings and to uncover said fluid openings for flow past the shoes; each of said valve shoes being a laminated valve composed of a plurality of thin resilient membranes one over the other in slidable contact with each other and each arched relative to the inner cylinder to uncover the hydraulic fluid openings and being capable of conforming to the outer surface of the inner cylinder to cover such openings when urged against the cylinder by the expanding diaphragm, said membranes acting together to provide combined thickness and strength to cover and uncover said openings while sliding relative to each other responsive to hydraulic fluid pulsations.

2. A pulsation absorbing device as claimed in claim 1, wherein each of said plurality of thin membranes has straight transverse side edges.

3. A pulsation absorbing device as claimed in claim 1, wherein each of said plurality of thin membranes has transverse side edges located beyond openings and cut away to define one or more recesses.

4. A pulsation absorbing device as claimed in claim 1, wherein each of said plurality of membranes has the same transverse length.

5. A pulsation absorbing device as claimed in claim 1, wherein the membrane closest to the inner cylinder has a transverse dimension greater than the membrane thereover.

6. A pulsation absorbing device as claimed in claim 1, wherein each of said plurality of thin membranes has the same thickness.

7. A pulsation absorbing device as claimed in claim 1, wherein said plurality of thin membranes are composed of an upper membrane and a lower membrane the thickness of which is smaller than that of said upper membrane.

* * * * *